March 24, 1970  V. A. KUZIVANOV ET AL  3,501,958

GRAVITY METER

Filed Oct. 27, 1966

United States Patent Office 3,501,958
Patented Mar. 24, 1970

3,501,958
GRAVITY METER
Vladimir Alexeevich Kuzivanov, Ulitsa Televidenia 6/2, korpus B, kv. 24; Igor Alexandrovich Maslov, Leningradskoe shosse 104, korpus 1, kv. 6; and Igor Ilich Naumenko-Bondarenko, Ulitsa Gorkogo 29a, kv. 45, all of Moscow, U.S.S.R.
Filed Oct. 27, 1966, Ser. No. 589,874
Int. Cl. G01v 7/12, 7/16
U.S. Cl. 73—382         4 Claims

ABSTRACT OF THE DISCLOSURE

A gravity meter suitable for measuring the force of gravity from a moving body is provided with at least two pendulums placed in a damping medium and having reflective mirrors thereon for projecting light rays onto a recording instrument to produce an image constituting a graphical representation of oscillations of the pendulums. The images of the pendulum are brought into coincidence for static conditions of the pendulums and the shape and size of the pendulums and the damping medium are selected so that the pendulums have the same identical sensitivity under static conditions and dissimilar sensitivities under dynamic conditions.

---

This invention relates to instruments for gravimetric measurements and, more specifically, to gravity meters intended for measuring the force of gravity on board a moving ship.

Known are gravity meters wherein the force of gravity is measured on board a ship by means of at least two pendulums disposed in a damping medium. In the known gravity meters, the pendulums are of equal static and dynamic sensitivity, and the magnitude of the force of gravity is found by averaging the half-sum of the pendulum readings, the position of the pendulums being dependent upon gravitational and random accelerations.

A disadvantage of the known gravity meters is their low efficiency, for each determination takes from 20 to 40 minutes in order to eliminate from the pendulum readings the effects of random accelerations which may exceed by a factor of hundreds or thousands the magnitude of the gravity anomaly sought.

It is an object of the present invention to provide a gravity meter for measuring the force of gravity on board a moving ship that will substantially increase the measuring efficiency and will render it possible to carry out a measurement of the force of gravity within a period of 1 to 2 min.

In accordance with this and other objects, the gravity meter of the present invention incorporates an arrangement for bringing into coincidence, on a recording instrument, pendulum readings under static conditions, the size and shape of the pendulums and the damping medium being selected so that the pendulums having one and the same sensitivity under static conditions have dissimilar dynamic sensitivities.

Figure 1:
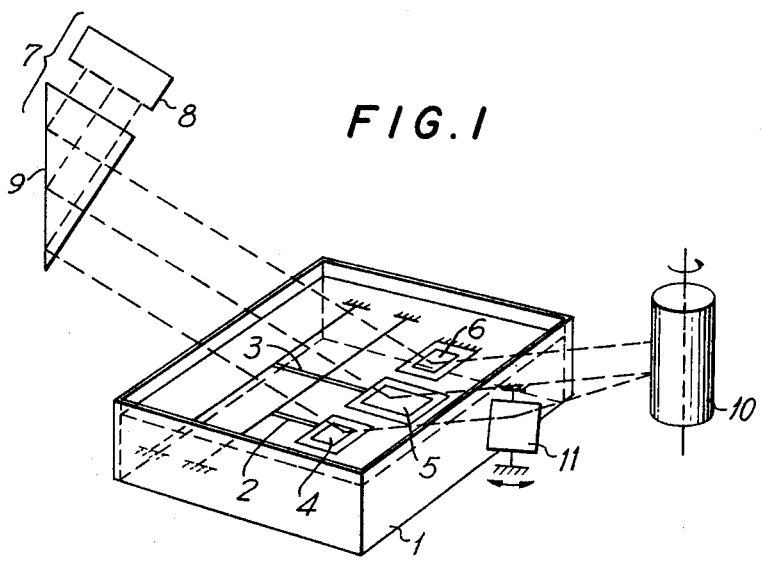
Figure 2:
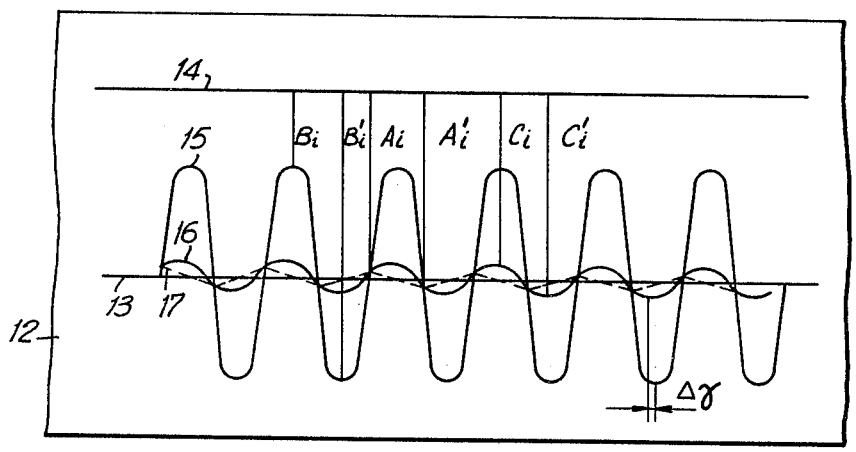

The present invention is illustrated hereinbelow by an exemplary embodiment thereof and the appended drawing, wherein:

FIG. 1 is a schematic diagram of the gravity meter according to the present invention; and FIG. 2 is a photographic recording of the index curves for the ocscillations of the pendulums of the present gravity meter and of the curve plotting the averaged magnitudes of the force of gravity.

The present gravity meter comprises a casing 1 (FIG. 1), pendulums 2 and 3 made of fused quartz and placed in a highly damping medium, mirrors 4 and 5 disposed on the surface of damping plates of said pendulums, a fixed mirror 6, an illuminator 7 consisting of a lamp 8 and a prism 9, and an arrangement for bringing into coincidence, on a recording instrument 10, the readings of pendulums 2 and 3 obtained under static conditions, said arrangement being comprised of a rotating mirror 11.

Pendulums 2 and 3 have identical sensitivity under static conditions, but display dissimilar dynamic sensitivity, i.e. are characterized by unequal damping factors.

In order to obtain dissimilar damping factors, the shape and size of pendulums 2 and 3, as well as the damping medium in which said pendulums are contained, may be selected according to several patterns.

In a specific embodiment of the present gavity meter described hereinbelow, dissimilar damping factors of pendulums 2 and 3 are obtained by placing said pendulums in a similar liquid medium, using damping plates of unequal area.

It is likewise feasible to obtain dissimilar damping factors in pendulums 2 and 3 by employing identical pendulums placed in liquid media of unequal viscosity.

When pendulums 2 and 3 are made from metal, recourse may be had to magnetic damping to obtain dissimilar damping factors.

The gravity meter according to the present invention operates according to the following principle.

Prior to measuring the force of gravity on board a moving ship, light rays from illuminator 7 are directed onto mirrors 4 and 5; upon reflection from said mirrors and mirror 11, the light rays fall on photgoraphic film 12 (FIG. 2) of recording instrument 10. The readings of pendulums 2 and 3, which are in static equilibrium, will, therefore, be projected onto film 12 and recorded on said film in the form of a single line 13.

Also projected on film 12 is the light beam reflected from fixed mirror 6, said light beam being likewise recorded on said film in the form of a single line 14.

When the ship is moving, gravitational and random accelerations will cause pendulums 2 and 3 to oscillate with respect to the equilibrium position which characterizes the magnitude of the gravitational acceleration sought, and curves 15 and 16 will be obtained on photographic film 12.

It is common knowledge that the phase shift $\gamma$ of oscillations of a strongly damped pendulum is related to a nearly harmonic disturbing force as given by the following equation:

$$\gamma \approx \text{arc tg} \frac{2\lambda\omega}{n^2 - \omega^2}$$

where $\lambda$ is the damping factor of a pendulum;
$\omega$ is the wave frequency of random oscillations; and
$n$ is the natural frequency of pendulum oscillations.

From the above equation it follows that a $2\lambda \to \infty$ the phase shift $\gamma$ will tend asymptotically to $\pi/2$.

It is desirable that the phase shift $\Delta\gamma$ between [2] pendulums 2 and 3 shall not exceed 10 deg.

If, for example, the conditions are observed, wherein $n^2 = 100$ sec.$^{-1}$ and $2\lambda = 2,500$ sec.$^{-1}$, then the phase shift $\Delta\gamma$ at $\omega = 0.5$–1 sec.$^{-1}$ will equal 88–89 deg., i.e. the phase shift $\Delta\gamma$ between pendulums 2 and 3 will be 1–2 deg. When the phase shift $\Delta\gamma$ between the pendulums 2 and 3 equals 1 to 2 deg., the measuring of the force of gravity will yield most accurate results.

Because of the unequal dynamic sensitivity of pendulums 2 and 3, the recorded amplitudes of pendulum movement will be dissimilar.

A curve 17, traced through the points of coincidence of the pendulum readings on curves 15 and 16, corresponds to the position that is quite close to the equilibrum position of said pendulums assumed by them under the effect of the force of gravity.

To determine the force of gravity, recourse is had to averaging the ordinates $A_i$ and $A_i'$ at the intersection points of curves 15 and 16 with reference to curve 14, instead of averaging the ordinates $B_i$, $B_i'$ and $C_i$, $C_i'$ of curves 15 and 16. In view of the fact that dispersion of the ordinates $A_i$ and $A_i'$ is much lower than that of the ordinates $B_i$, $B_i'$ and $C_i$, $C_i$, there takes place a repeated damping of random accelerations charactedized by the wave frequency W of the order of 0.51–1 sec.$^{-1}$. Said repeated damping renders it possible to markedly decrease the effect of random accelerations having the wave frequency W and to eliminate their influence on the instrument readings within the period of 1 to 2 minutes.

In the description of the specific embodiment of the present invention use is made, for the sake of clarity, of specific terminology. The invention, however, is in no way limited by the terminology used, and it should be borne in mind that each specific term employed embraces all the equivalent elements that functions analoguously and are used to solve identical problems.

Although the present invention has been described with reference to the specific embodiment thereof, it will be readily understood by those skilled in the art that various changes and modifications may be restorted to without deviating from the spirit and scope of the invention.

We claim:
1. A gravity meter for measuring the force of gravity from a moving body, said meter comprising: a casing; at least two pendulums in said casing and placed in a damping medium, the shape and size of said pendulums and said damping medium being selected so that said pendulums have identical sensitivities under static conditions and dissimilar sensitivities under dynamic conditions; reflective means on said pendulums; means for illuminating said reflective means with light rays; a recording instrument positioned to receive light rays reflected from said reflective means and operable to produce images constituting graphical representations of the oscillations of said pendulums during a period of time under dynamic conditions, whereby intersection points of said graphical representations of the oscillations of said pendulum represent the positions whereat said pendulums are affected only by the force of gravity; means for bringing the image of said pendulums on said recording instrument into coincidence under static conditions of the pendulums, whereby the image of the coincident position of said pendulums would be graphically represented on the recording instrument as a straight line; and means for graphically representing a reference line on said recording instrument, whereby the measurement of the force of gravity is related to an average of the distance from each of the points of intersection of the oscillations of the pendulums under dynamic conditions to the reference line.

2. A meter as claimed in claim 1 wherein said means for graphically representing a reference line on said recording instrument comprises a fixed reflector in said casing positioned to be illuminated by said means which illuminates the pendulums and to project a reference line onto said recording instrument.

3. A meter as claimed in claim 1 wherein said pendulums are of different size.

4. A meter as claimed in claim 1 wherein said pendulums are supported in respective damping mediums having different damping characteristics.

References Cited

UNITED STATES PATENTS

| 1,792,013 | 2/1931 | Hayes | 73—382 |

FOREIGN PATENTS

| 153,370 | 3/1961 | U.S.S.R. |
| 1,584,427 | 7/1961 | U.S.S.R. |

JAMES J. GILL, Primary Examiner

JOHN R. FLANAGAN, Assistant Examiner